(12) United States Patent
Ciamillo

(10) Patent No.: US 7,000,739 B2
(45) Date of Patent: Feb. 21, 2006

(54) CAM ASSISTED WHEEL BRAKE

(76) Inventor: Theodore J. Ciamillo, 1971 Simonton Bridge Rd., Watkinsville, GA (US) 30677

( * ) Notice: Subject to any disclaimer, the term of this patent is extended or adjusted under 35 U.S.C. 154(b) by 0 days.

(21) Appl. No.: 10/670,895

(22) Filed: Sep. 24, 2003

(65) Prior Publication Data
US 2004/0074704 A1  Apr. 22, 2004

Related U.S. Application Data

(60) Provisional application No. 60/417,027, filed on Oct. 7, 2002.

(51) Int. Cl.
B62L 3/00 (2006.01)

(52) U.S. Cl. .............................. 188/24.22; 188/24.12; 188/2 D

(58) Field of Classification Search ............. 188/24.11, 188/24.12, 24.14, 24.15, 24.16, 24.22, 24.21, 188/2 D, 344
See application file for complete search history.

(56) References Cited

U.S. PATENT DOCUMENTS

| | | | | |
|---|---|---|---|---|
| 3,314,504 A | * | 4/1967 | Altenburger | 188/24.19 |
| 3,628,635 A | * | 12/1971 | Yoshigai | 188/26 |
| 4,014,408 A | * | 3/1977 | Armstrong | 188/24 |
| 4,064,972 A | * | 12/1977 | Ohtani et al. | 188/24 |
| 4,482,033 A | * | 11/1984 | Yoshigai | 188/24.19 |
| 4,667,778 A | * | 5/1987 | Ozaki | 188/24.12 |
| 4,852,698 A | * | 8/1989 | Nagano | 188/24.19 |
| 5,188,200 A | * | 2/1993 | Modolo | 188/24.11 |
| 5,425,434 A | * | 6/1995 | Romano | 188/24.19 |
| 5,464,074 A | * | 11/1995 | Yoshikawa | 188/24.22 |
| 5,819,880 A | * | 10/1998 | Ota et al. | 188/24.22 |

* cited by examiner

Primary Examiner—Matthew C. Graham
Assistant Examiner—Mariano Sy
(74) Attorney, Agent, or Firm—Powell Goldstein LLP; Jason A. Bernstein; Charles L. Warner, II

(57) ABSTRACT

A cam assisted wheel brake for a bicycle comprising two arms mounted on a bolt, which provides a pivot point for the arms and a means for attachment of the brake to the fork of the bicycle. The brake incorporates a cam lever pivotably associated with the first arm and which engages a finger portion of the second arm and which comprising a first portion having a screw passing through a bore, a middle portion having a top edge having a curved edge portion, and a second portion pivotably connected to the first arm by a pin extending therethrough. The invention preferably has a quick release mechanism comprising a lever having a first pin extending therefrom, the pin pivotably engaging a bore in the first arm, and a second pin extending off axis from the first pin and pivotably engaging the second portion of the cam lever.

19 Claims, 7 Drawing Sheets

SCISSOR TYPE

DUAL PIVOT TYPE

FRONT CLOSED

CAM ASSISTED WHEEL BRAKE

CROSS-REFERENCE TO RELATED APPLICATION

This application claims the benefit to provisional application No. 60/417,027, filed on Oct. 7, 2002, entitled CAM ASSISTED WHEEL BRAKE, the disclosure of which is incorporated by reference in its entirety herein.

FIELD OF THE INVENTION

This present invention relates to brakes for road bicycles and other wheeled vehicles.

BACKGROUND OF THE INVENTION

There are a number of bicycle brakes of various designs on the market, most of which are either scissor type brakes (FIG. 1) or dual pivot (FIG. 2). There are advantages to both designs. The idea is to build in enough leverage to develop the necessary power to stop the bicycle while at the same time keeping the size and weight of the brake to a minimum. In each of these designs, the brakes draw two opposing pads onto each side of the rim of the bike wheel. The brake squeezes the rim of the wheel between the two pads using a cable, two arms which hold the pads, and a lever at the handle bar. The advantage of the scissor brake is that it can usually be made lighter than the dual pivot due to a reduced number of parts. However, the scissor brakes usually do not have as much power as the dual pivot style. The dual pivot design increases power by lengthening one of the arms through the use of a secondary pivot, which is off center of the normal pivot. These brakes are also cast or forged aluminum which does not bend much before breaking, therefore if the brake does fail, the failure is catastrophic and all function is lost. This fact forces manufacturers to build the brakes a bit bigger to avoid liability issues.

It would desirable to have a brake system that has the braking power necessary to safely slow or stop the vehicle or device while being lightweight and easy to manufacture.

SUMMARY OF THE INVENTION

The present invention is an improvement of the previously existing scissor brake. It utilizes a lever cam to increase the force applied to the arms. It also provides a novel quick release mechanism to open the brake slightly in the event the rim is damaged; this keeps the pads from rubbing on the rim in the open position. Furthermore, the present invention provides a plastic spring for opening the brake, which provides a lighter solution than a steel spring.

In one exemplary embodiment of the present invention, a brake apparatus for a wheeled vehicle, the wheeled vehicle having at least one wheel including a rim, comprises: a first arm having a first portion for attaching a brake pad thereto, a middle portion having a bore extending through a portion thereof, a second portion having a bore extending therethrough, and an extension for accepting a brake cable adjuster. A second arm has a first portion for attaching a brake pad thereto, a middle portion having a bore extending through a portion thereof; a finger portion extending toward the first arm. The apparatus also includes a bolt extending through the first arm second portion bore and through the second arm middle portion bore for providing a pivot point for the first and second arms and also for providing an attachment mechanism for attachment to the wheeled vehicle. The apparatus further includes a cam lever having a top edge and a bottom edge and having a first portion having a bore extending through a portion thereof, a middle portion a curved edge portion extending from the top edge, the curved edge portion being capable of contacting the second arm finger portion; a second portion having a bore extending through a portion thereof, a pin extending through the cam lever second portion bore, the pin permitting the cam lever to pivot about the pin, the pin being associated with the first arm; and, a spring associated with the first arm and the second arm.

The brake apparatus preferably further comprises a quick release mechanism comprising a lever, a first pin extending from the lever and extending through the first arm second portion bore, a second pin extending from the first pin, the axis of the second pin being offset from the longitudinal axis of the first pin, the second pin pivotably passing through the cam lever second portion bore.

BRIEF DESCRIPTION OF THE DRAWINGS

The invention is illustrated in the drawings in which like reference characters designate the same or similar parts throughout the figures of which.

DETAILED DESCRIPTION OF THE EMBODIMENTS

Figure 1:
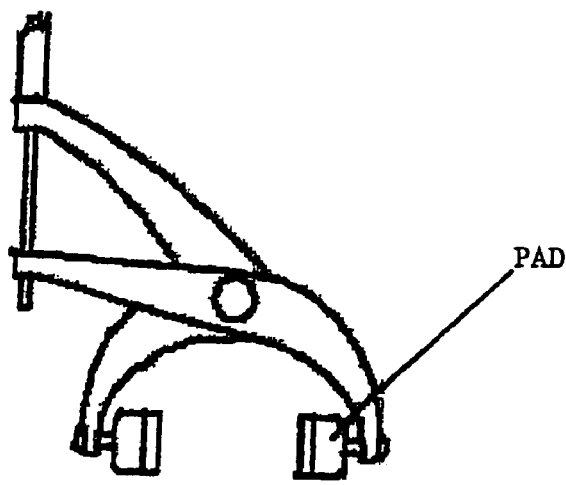
FIG. 1 is a schematic view of a prior art brake of the scissor type.
Figure 2:
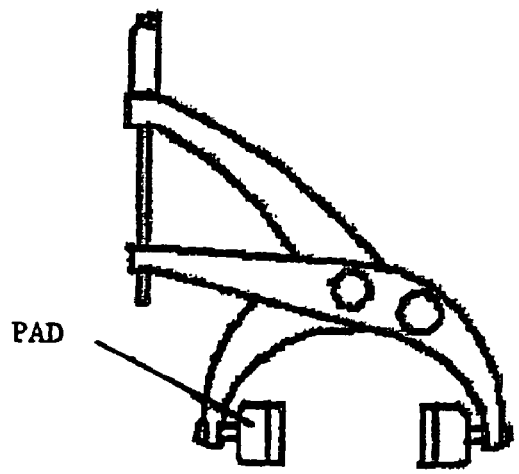
FIG. 2 is a schematic view of a prior art brake of the dual pivot type.

An exemplary embodiment of the invention is a brake device 10 shown FIGS. 3–8. The brake device 10 comprises a first arm 12 and a second arm 14 mounted on a bolt 16, which provides a pivot point for the arms 12, 14 and a means for attachment of the brake 10 to a fork of a bicycle or other wheeled vehicle. The bolt 16 has a nut 17 which is used to secure the brake device 10 to the vehicle.

The first arm 12 comprises a downward depending brake pad attachment portion 20, a cable attachment portion 22, a middle portion 24 and a pivot portion 26 attached via a bore 28 (not visible in the FIGS., but is known to those of ordinary skill in the art) to the bolt 16. The middle portion 24 receives a quick release latch 30. The quick release latch 30 comprises a finger operable lever 32 having a first pin portion 34 which extends through one side of a latch middle portion 36 to the other side of a latch middle portion 36. A secondary pin portion 38, which is offset from the axis of the first pin portion 34 (as seen in FIGS. 3 and 5), is pivotably connected with a cam lever 52, as described in greater detail hereinbelow.

The second arm 14 also has downward depending brake pad attachment portion 42 which opposes the first arm attachment portion 20. The second arm 14 also has a pivot portion 46 with a bore 48 (not visible in the Figures, but is known to those of ordinary skill in the art) which is pivotably attached to the bolt 16. The second arm 14 also has a finger portion 50.

Figure 3:
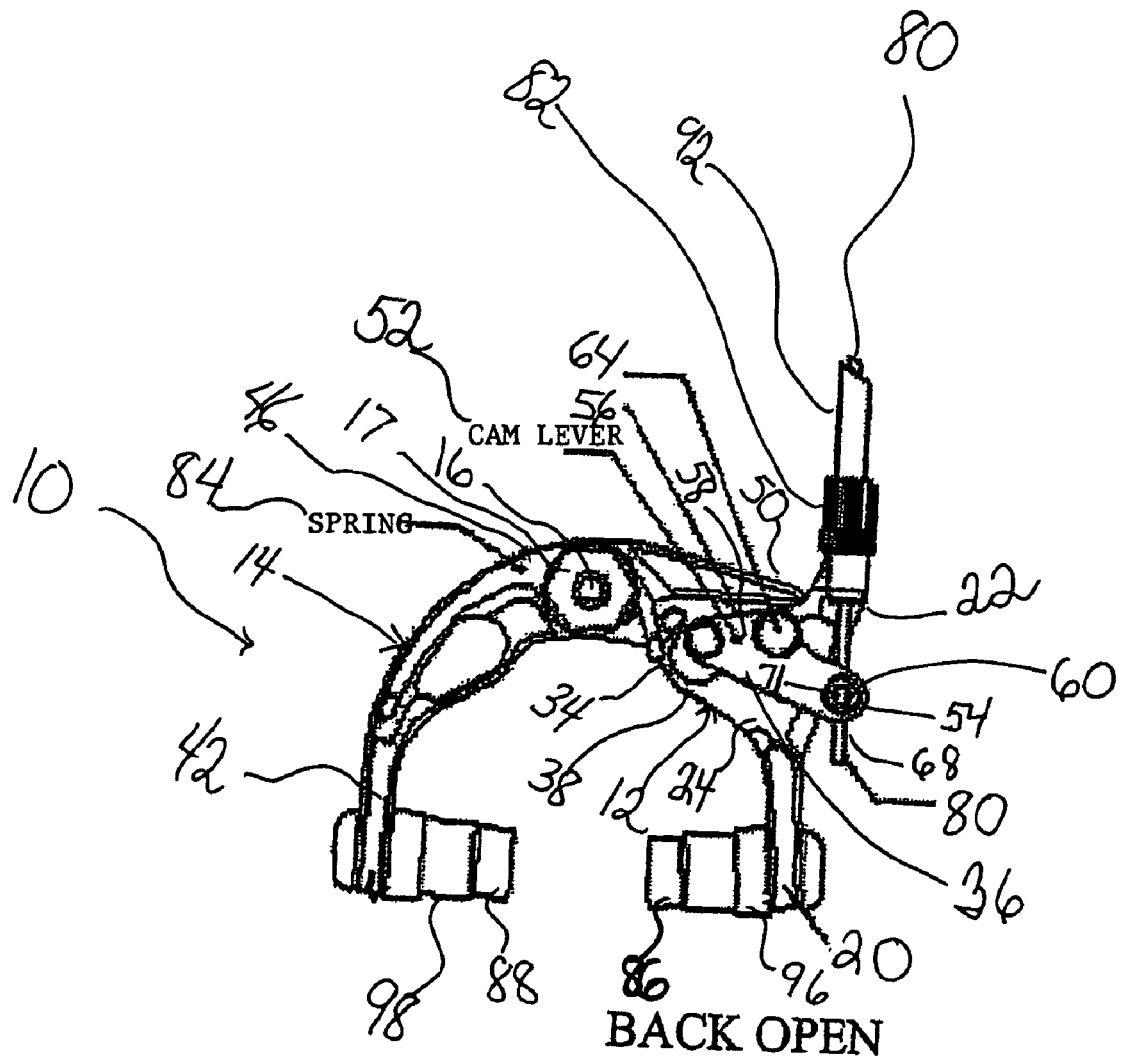
FIG. 3 is a schematic view of one exemplary embodiment of the present invention from the back in the open position.
Figure 4:
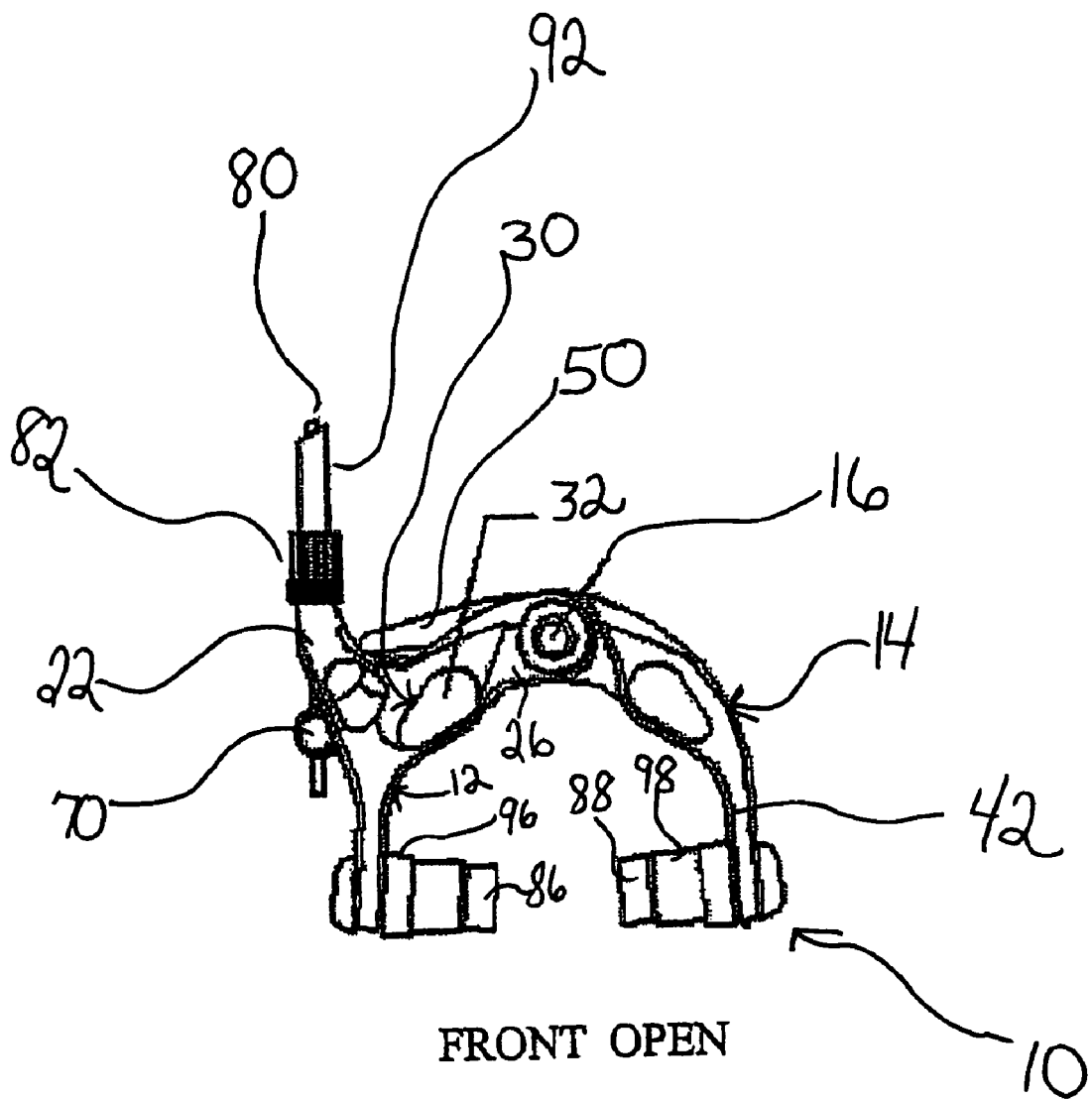
FIG. 4 is a schematic view of the embodiment of FIG. 3 from the front in the open position.
Figure 8:
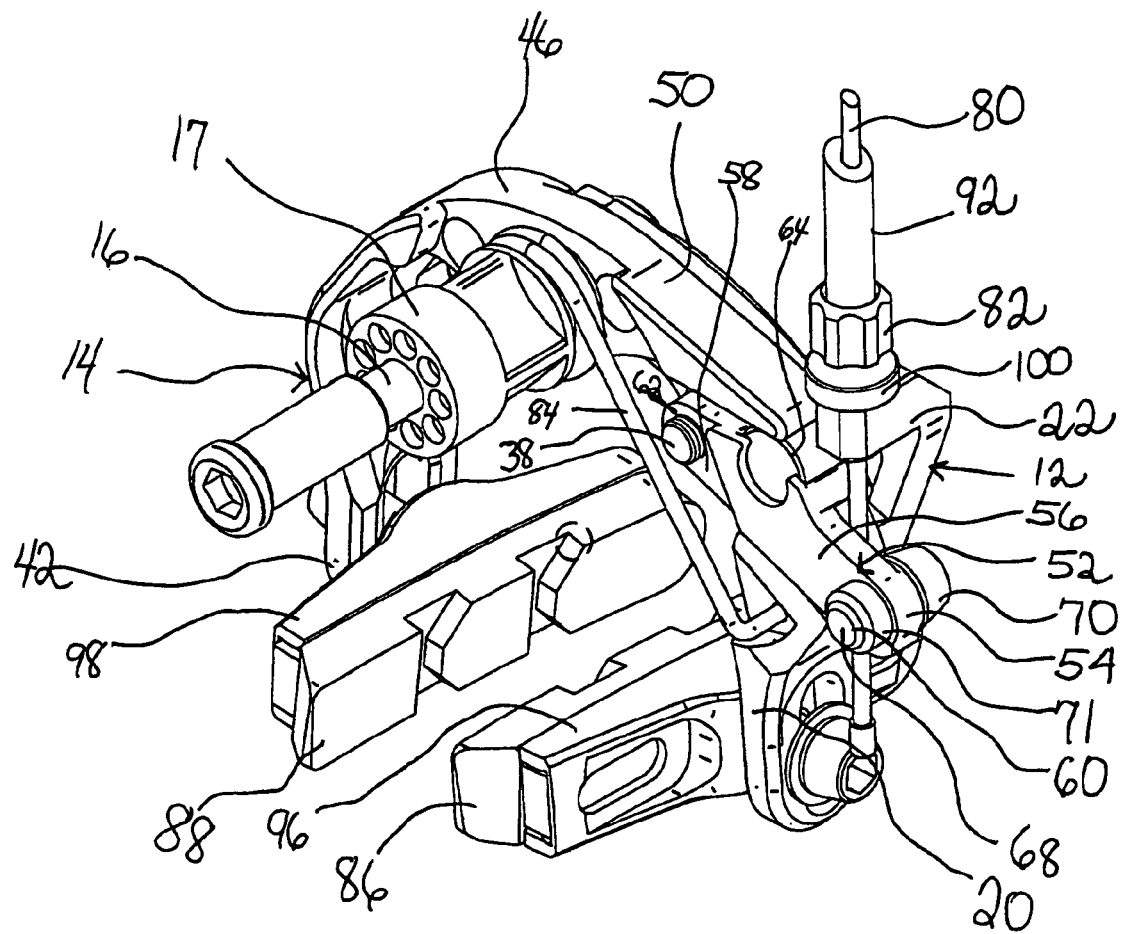
FIG. 8 is a different perspective view of the embodiment of FIG. 3.

The cam lever 52, as shown in more detail in FIGS. 3 and 8, comprises a first end portion 58, a middle portion 56, and a second end portion 54. The first end portion 54 has a bore 60 extending therethrough. The secondary pin portion 38 passes through the bore 60 and is held in place at one end by a fastener 62. The middle portion 56 of the cam lever 52 includes a curved edge portion 64. The second end portion 58 has a threaded bore 66 (not shown) passing therethrough. A threaded set screw 68 having a head 70 is threaded into the bore 66. The screw is held in place by a nut 71 (as shown in FIGS. 3, 5 and 8). The end of the cable 80 is attached to the second end portion 58 by being squeezed between the screw head 70 and the second end portion 58, as is known to those skilled in the art. The cam lever 52 pivots about the secondary portion of the secondary pin portion 38 in response to movement by the cable 22 being pulled.

Figure 5:
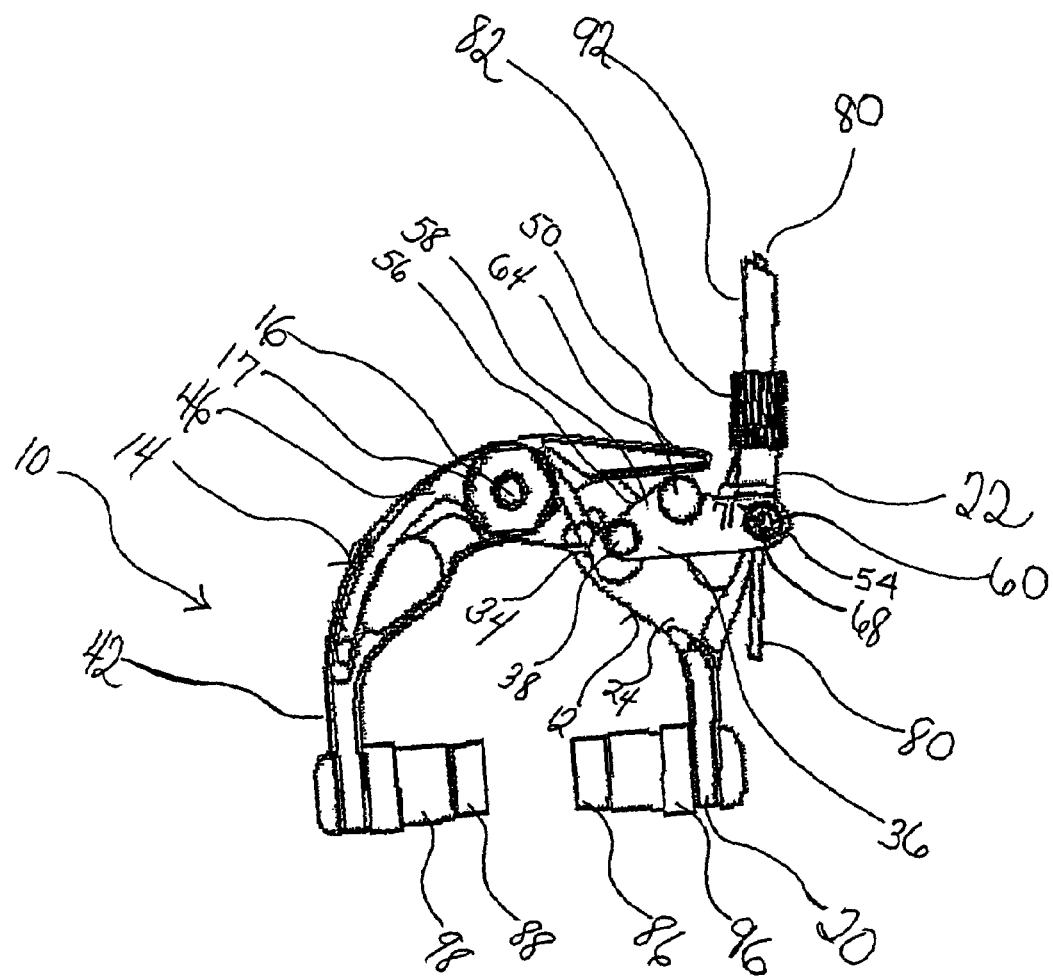
FIG. 5 is a schematic view of the embodiment of FIG. 3 from the back in the closed position.
Figure 6:
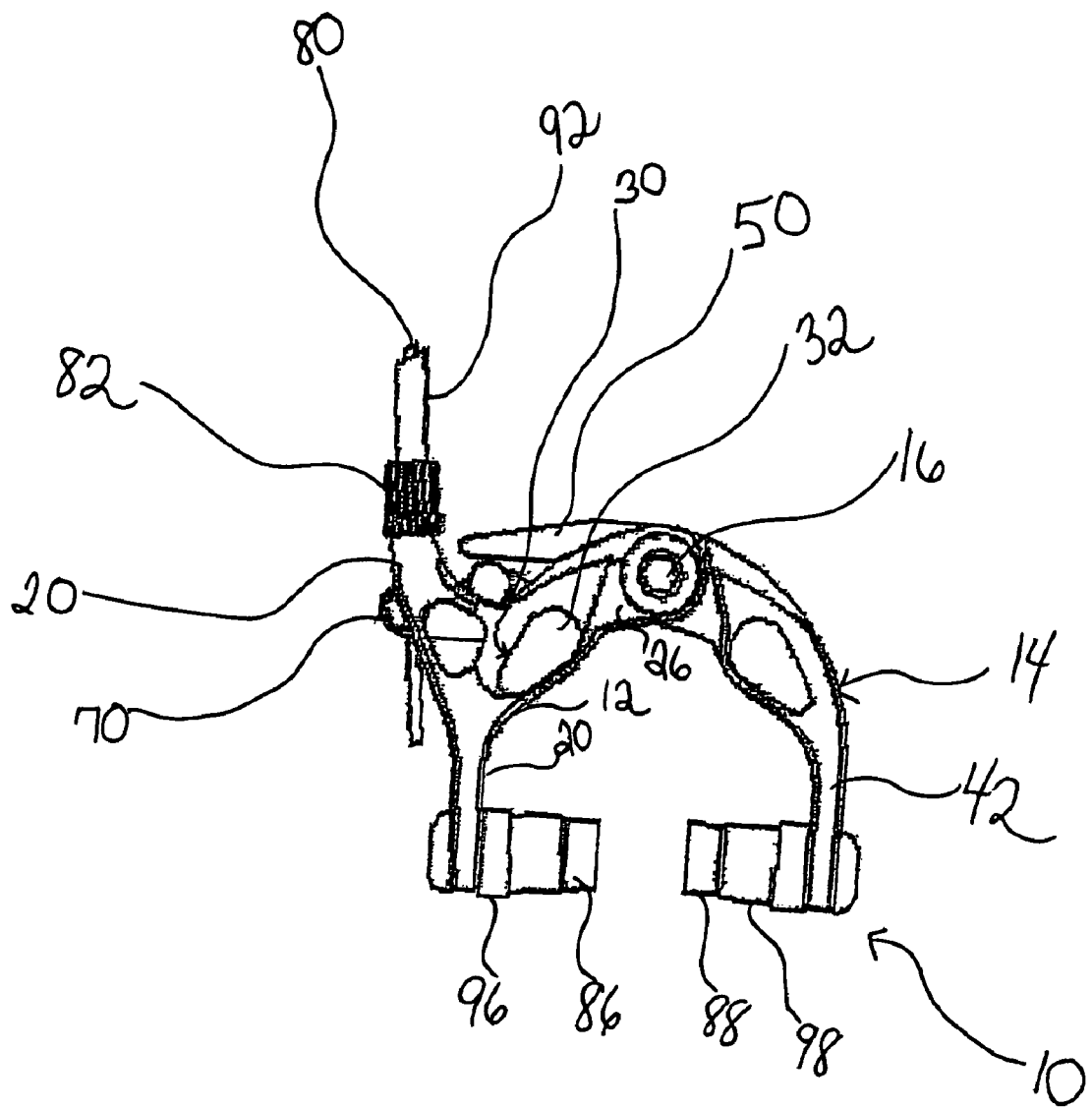
FIG. 6 is a schematic view of the embodiment of FIG. 3 from the front in the closed position.
Figure 7:
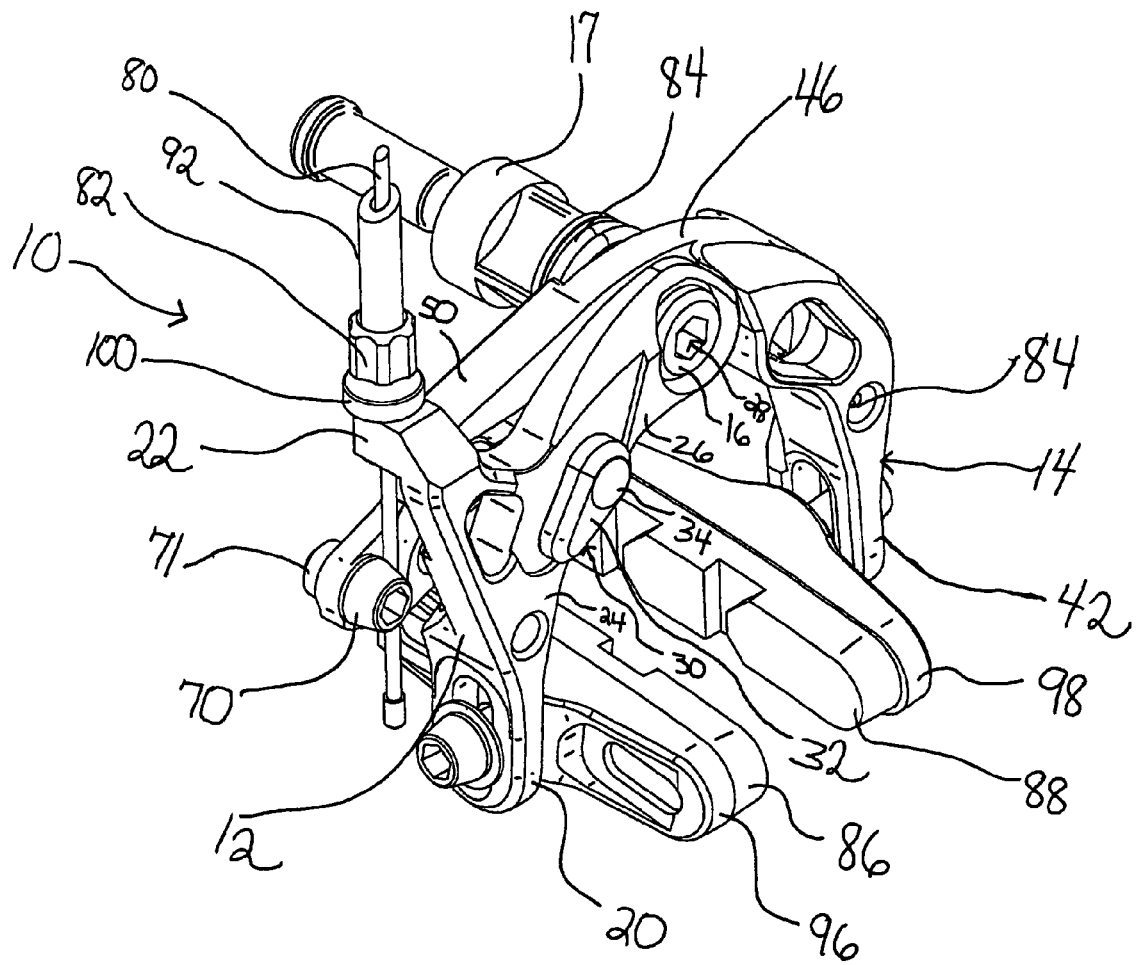
FIG. 7 is a perspective view of the embodiment of FIG. 3.

As shown in FIGS. 3 and 5, the cam lever 52 has the curved edge portion 64 positioned, with respect to an imaginary center line drawn between the first end portion 54 and the second end portion 58, offset slightly toward the first end portion 54. This slight offset toward the pivot point provides increased torque during closure of the brake device 10 compared to curved edge portion 64 that would be positioned directly at the aforesaid imaginary center line.

The arm 12 with the cam lever 52 also has provision for the bike's cable 80 housing adjuster 82. The brake 10 has a spring 84, preferably made of plastic, which provides an opposing force to the cable 80 and opens the brake 10, i.e., by moving the brake pads 86, 88 apart. When the conventional brake lever 90 (not shown, but which is known to those skilled in the art) on the bicycle handle bar (not shown) is pulled, the existing cable 80 is drawn into the housing 92, which is attached to one arm 12. The end of the cable 80 is attached to the free end of the cam lever 52 and pulls the cam lever 52 up toward the cable adjuster 82. The curved edge portion 64 of the cam lever 52 makes contact with the finger portion 50 of the second arm 14. This causes the arms 12, 14 to pivot in a way that draws the brake pads 86, 88 toward each other and squeezes the rim 94 (not shown) of the bicycle, thus exerting the braking force. When the lever 90 on the handle bar is released, the plastic spring 84 forces the arms 12, 14 back to the open position. The lever 32 of the quick release latch 30 may be moved upward to drop the fulcrum of the cam lever 52. This drops the curved edge portion 64 and allows the brake pads 86, 88 of the brake 10 to open up further with respect to each other.

Off-the-shelf components that may be used with the brake 10 are pads 86, 88 and pad holders 96, 98, cable adjuster 82, the center bolt 16, and a washer 100 for the setscrew 68.

ADVANTAGES

The present invention uses the novel cam lever mechanism to increase the force to the brake arms, thereby enabling the arms to be shorter than what would be required with direct application of the same force to generate the same squeezing power on the rim. One advantage of the present apparatus for applying a squeezing force on the rim is that the arms of the brake can be much smaller above the pivot point than any existing brake. This decreases the size and weight of the brake. Another advantage is the arms are preferably machined from 7075 aluminum which is roughly twice as strong as most cast aluminum alloys and offers the benefit of bending rather than breaking when being overstressed. This allows the parts to be made smaller and lighter. The cam quick release is a novel approach to opening the brake further and the plastic spring offers a lighter weight approach to steel springs for opening the brake. Also, the cam mechanism is used for lowering the cam lever for quick release.

These ideas may have been over looked due to the perception that a direct application of force would be a more efficient approach and that machining parts is costlier than casting or forging. Also, that in the past, machined components have not received the level of desire by the consumer that they enjoy today as more and more road bike enthusiasts seek to push the envelope of the lightest equipment possible.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

I claim:

1. A brake apparatus for a wheeled vehicle, said wheeled vehicle having at least one wheel including a rim, said brake apparatus comprising:
   a) a first arm having
      i) a first portion for attaching a brake pad thereto,
      ii) a middle portion having a bore extending through a portion thereof,
      iii) a second portion having a bore extending therethrough, and
      iv) an extension for accepting a brake cable adjuster;
   b) a second arm having
      i) a first portion for attaching a brake pad thereto,
      ii) a middle portion having a bore extending through a portion thereof,
      iii) a finger portion extending toward said first arm;
   c) a bolt extending through said first arm second portion bore and through said second arm middle portion bore for providing a pivot point for said first and second arms and also for providing an attachment mechanism for attachment to said wheeled vehicle;
   d) a cam lever having a top edge and a bottom edge and having
      i) a first portion having a bore extending through a portion thereof,
      ii) a middle portion,
      iii) a curved edge portion extending from said top edge, said curved edge portion being capable of contacting said second arm finger portion;
      iv) a second portion having a bore extending through a portion thereof,
      v) a pin extending through said cam lever second portion bore, said pin permitting said cam lever to pivot about said pin, said pin being associated with said first arm; and
   e) a spring associated with said first arm and said second arm.

2. The brake apparatus of claim 1, further comprising a quick release mechanism comprising:
   a) a lever,
   b) a first pin extending from said lever and extending through said first arm second portion bore, c) a second pin extending from said first pin, said second pin having an axis being offset from the axis of said first pin, said second pin pivotably passing through said cam lever second portion bore.

3. The brake apparatus of claim 2, further comprising a fastener for maintaining said cam lever on said lever second pin.

4. The brake apparatus of claim 1, further comprising a screw extending substantially through said cam lever first portion bore.

5. The brake apparatus of claim 1, further comprising a hollow screw passing through a bore defined in said first arm first extension, said hollow screw being sized to receive a portion of said brake cable.

6. The brake apparatus of claim 1, further comprising a nut sized to fit over said bolt.

7. A brake apparatus for a wheeled vehicle, said wheeled vehicle having at least one wheel including a rim, said brake apparatus comprising:
   a) a first arm having
      i) a first portion for attaching a brake pad thereto,
      ii) a middle portion having a bore extending through a portion thereof,
      iii) a second portion having a bore extending therethrough, and
      iv) an extension for accepting a brake cable adjuster;
   b) a second arm having
      i) a first portion for attaching a brake pad thereto,
      ii) a middle portion having a bore extending through a portion thereof,
      iii) a finger portion extending toward said first arm;
   c) a bolt extending through said first arm second portion bore and through said second arm middle portion bore for providing a pivot point for said first and second arms and also for providing an attachment mechanism for attachment to said wheeled vehicle;
   d) a cam lever having a top edge and a bottom edge and having
      i) a first portion having a bore extending through a portion thereof,
      ii) a middle portion a curved edge portion extending from said top edge, said curved edge portion being capable of contacting said second arm finger portion;
      iii) a second portion having a bore extending through a portion thereof,
      iv) a pin extending through said cam lever second portion bore, said pin permitting said cam lever to pivot about said pin, said pin being associated with said first arm;
   e) a spring associated with said first arm and said second arm; and
   f) a quick release mechanism comprising:
      i) a lever,
      ii) a first pin extending from said lever and extending through said first arm second portion bore,
      iii) a second pin extending from said first pin, said second pin having an axis being offset from the axis of said first pin, said second pin pivotably passing through said cam lever second portion bore,
   said quick release mechanism when operated causes said cam lever to shift from a first engaged orientation to a second release orientation whereby when shifted into said second release orientation causes said first arm first portion and said second arm first portion to move outward and away with respect to each other so that a wheel rim disposed therebetween can be removed.

8. A wheeled vehicle having a brake system, comprising:
   a) a frame;
   b) at least one fork extending from said frame;
   c) at least one wheel, each said wheel comprising a rim and an axle, said axle being associated with each fork;
   d) a brake mechanism associated with said rim and said frame, comprising:
      i) a first arm having
         (1) a first portion for attaching a brake pad thereto,
         (2) a middle portion having a bore extending through a portion thereof,
         (3) a second portion having a bore extending therethrough, and
         (4) an extension for accepting a brake cable adjuster;
      ii) a second arm having
         (1) a first portion for attaching a brake pad thereto,
         (2) a middle portion having a bore extending through a portion thereof,
         (3) a finger portion extending toward said first arm;
      iii) a bolt extending through said first arm second portion bore and through said second arm middle portion bore for providing a pivot point for said first and second arms and also for providing an attachment mechanism for attachment to said wheeled vehicle;
      iv) a brake cable having a first end and a second end;
      v) a cam lever having a top edge and a bottom edge and having
         (1) a first portion having a bore extending through a portion thereof,
         (2) a middle portion a curved edge portion extending from said top edge, said curved edge portion being capable of contacting said second arm finger portion;
         (3) a second portion having a bore extending through a portion thereof,
         (4) a pin extending through said cam lever second portion bore, said pin permitting said cam lever to pivot about said pin, said pin being associated with said first arm;
      vi) a spring associated with said first arm and said second arm; and
   e) a lever for actuating said brake system, said lever being operatively connected to said second end of said brake cable and to said frame.

9. The wheeled vehicle of claim 8, further comprising a quick release mechanism comprising:
   a) a lever,
   b) a first pin extending from said lever and extending through said first arm second portion bore,
   c) a second pin extending from said first pin, said second pin having an axis being offset from the axis of said first pin, said second pin pivotably passing through said cam lever second portion bore.

10. The wheeled vehicle of claim 9, further comprising a fastener for maintaining said cam lever on said lever second pin.

11. The wheeled vehicle of claim 8, further comprising a screw extending substantially through said cam lever first portion bore.

12. The wheeled vehicle of claim 8, further comprising a hollow screw passing through a bore defined in said first arm first extension, said hollow screw being sized to receive a portion of said brake cable.

13. The wheeled vehicle of claim 8, further comprising a nut sized to fit over said bolt.

14. A cam assisted wheel brake suitable for use with a bicycle, comprising:
 a) a first arm;
 b) a second arm:
 c) a screw for providing a pivot point for said first and second arms and also for providing an attachment mechanism for attachment to a fork of said bicycle;
 d) a cam lever having a lobe attached to said first arm by a brake cable;
 e) a spring for providing an opposing force to said cable and which can open said brake; and,
 f) quick release mechanism pivotably connected to said cam lever, said quick release mechanism comprising
  i) a lever;
  ii) a first pin portion having an axis of rotation, a first end associated with said lever and a second end, and
  iii) a second pin portion associated with said first pin portion second end and axially offset from said first pin portion.

15. A cam assisted wheel brake suitable for use with a bicycle or other apparatus having a wheel, comprising:
 a) a first arm;
 b) a second arm having a finger portion;
 c) a pivot member for providing a pivot point for said first and second arms and also for providing an attachment mechanism for attachment to a fork of said bicycle;
 d) a cam lever having
  i) a first end portion pivotably associated with said first arm,
  ii) a middle portion including a cam surface operatively engageable with said second arm, and
  iii) a second end portion; and
 e) a spring associated with said first and second arms for biasing said first and second arms in an open position.

16. The brake of claim 15, wherein said second end portion is operatively connected to a brake cable.

17. The brake of claim 16, wherein said brake cable is slidingly associated with a cable adjuster associated with said first arm such that pulling said cable causes said cam lever to pivot and said cam surface to engage said finger portion of said second arm.

18. The brake of claim 15, wherein said cam surface is disposed between said first and second portions of said cam lever.

19. A cam assisted wheel brake suitable for use with a bicycle or other apparatus having a wheel, comprising:
 a) a first arm having a first portion containing a first aperture and a second portion containing a second aperture for connecting to a brake pad;
 b) a second arm having
  i) a first portion containing a first aperture,
  ii) a second portion containing a second aperture for connecting to a brake pad and
  ii) a finger portion extending toward and overlapping a portion of said first arm, said finger portion having a outside surface and a inside surface;
 c) a screw for providing a pivot point for said first and second arms and also for providing an attachment mechanism for attachment to a fork of said bicycle;
 d) a cam lever having
  i) a first end portion pivotably associated with said first arm,
  ii) a middle portion including a cam surface operatively engageable with said inside surface of said finger portion, said cam surface being disposed between said first arm second portion and said second arm second portion, and
  iii) a second end portion; and
 e) a spring biasing said first and second arms in an open position.

* * * * *